Oct. 10, 1967

J. B. TIGRETT ETAL 3,345,685

MATCH MAKING MACHINE

Filed Aug. 30, 1965

INVENTORS
JOHN BURTON TIGRETT
VOORHIS F. WIGAL
BY Ralph W. Kalish

ATTORNEY

Oct. 10, 1967
J. B. TIGRETT ETAL
3,345,685
MATCH MAKING MACHINE
Filed Aug. 30, 1965
3 Sheets-Sheet 2
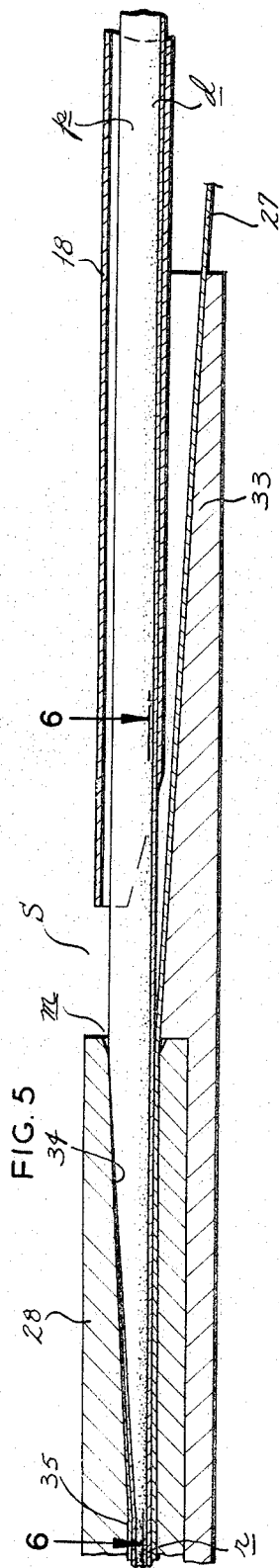
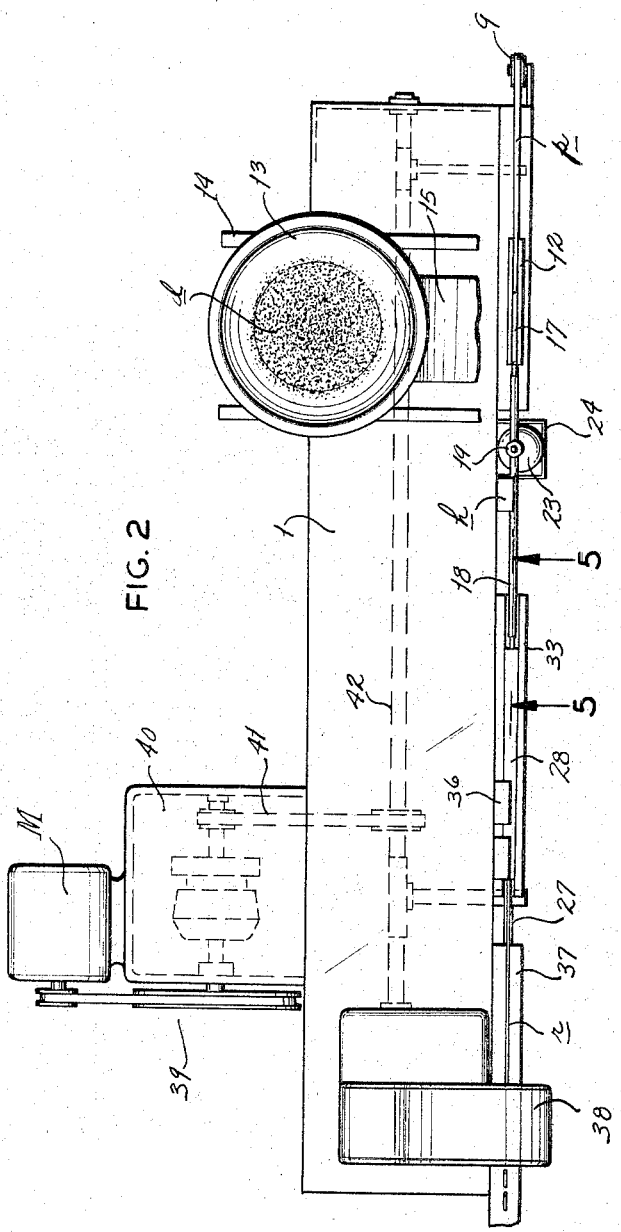
INVENTORS
JOHN BURTON TIGRETT
VOORHIS F. WIGAL
BY Ralph W. Kalish
ATTORNEY Oct. 10, 1967     J. B. TIGRETT ETAL     3,345,685
MATCH MAKING MACHINE
Filed Aug. 30, 1965     3 Sheets-Sheet 3
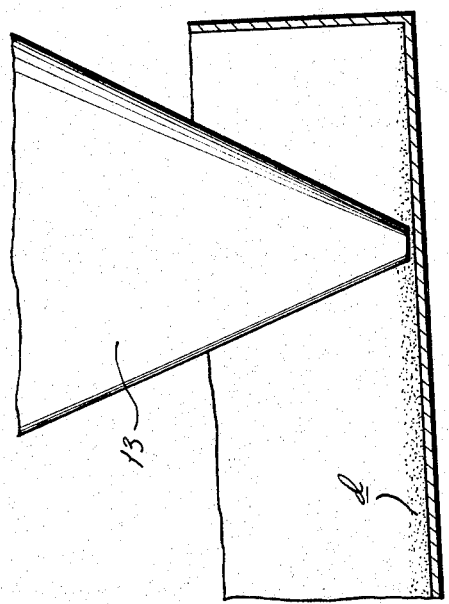
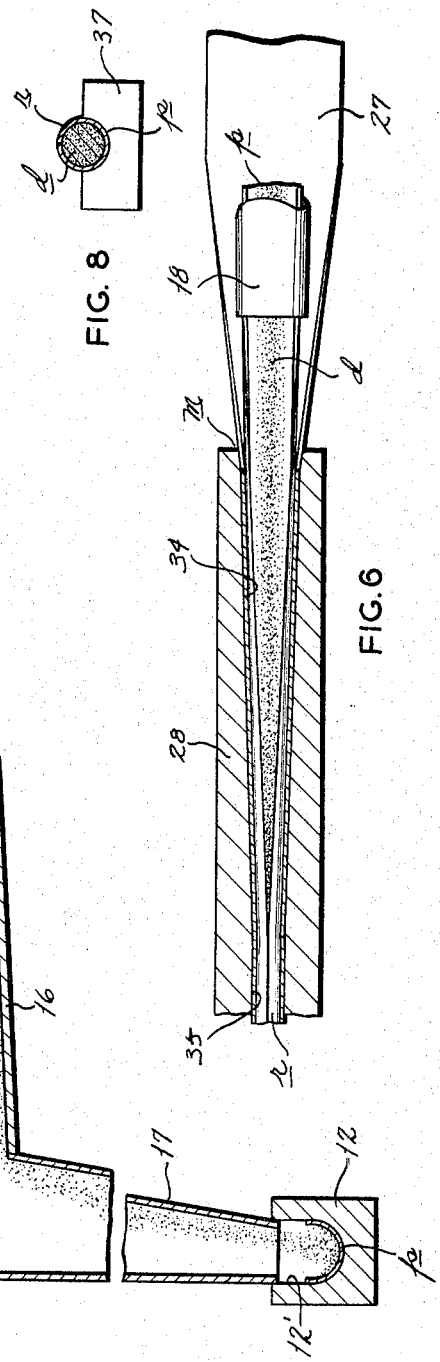
INVENTORS
JOHN BURTON TIGRETT
VOORHIS F. WIGAL
BY Ralph W. Kalish
ATTORNEY

United States Patent Office 3,345,685
Patented Oct. 10, 1967

3,345,685
MATCH MAKING MACHINE
John Burton Tigrett and Voorhis F. Wigal, both of Jackson, Tenn.; said Tigrett assignor to Tintarella, S.A., Glarus, Switzerland, a corporation of Switzerland
Filed Aug. 30, 1965, Ser. No. 483,507
5 Claims. (Cl. 18—4)

ABSTRACT OF THE DISCLOSURE

A machine for producing solid rod units from powdered material dispensed upon an arcuated conveyor of paper which is drawn longitudinally through a vapor chamber where a cohesion-promoting agent is sprayed on the powdered material for producing adhesion, said paper and material being drawn by an endless belt which is adapted to wrap around said arcuate paper conveyor, feeding same through a garniture for forming the paper and contained material into a rod shape; the belt being subsequently stripped from wrapped disposition around said rod shaped paper conveyor before the latter is severed into individual units.

---

This invention relates in general to continuous rod making machines and, more particularly, to a machine for producing a re-ignitable match.

It is an object of the present invention to provide a machine which is adapted to produce a continuous rod comprised of normally powdered ingredients, with means for severing the formed rod into units of predetermined length.

It is another object of the present invention to provide a machine of the character stated which is adapted to produce a continuous rod of a predetermined, non-metallic, homogeneous composition, and having means for introducing an agent for conducing to cohesion of the ingredients.

It is another object of the present invention to provide a machine of the character stated which is adapted to produce a continuous rod having a disposable casing, such as of paper or the like; and which does not require the intervention of any actions of an operator so that the machine is amenable to high volume, rapid production.

It is an additional object of the present invention to provide a machine of the character stated which is particularly suited for producing a re-ignitable match, as of the type set forth in our copending application, Ser. No. 439,947, filed Mar. 15, 1965; and wherein the disposable casing serves initially as a conveyor for delivery of the powdered ingredients to the rod forming operation.

It is a still further object of the present invention to provide a machine of the character stated which may be economically produced; which is reliable in operation; and which is capable of producing individual rod segments in a high speed, low-cost manner.

Other objects and details of the present invention will be apparent from the following description when read in connection with the accompanying drawings (three (3) sheets) wherein—

FIGURE 2 is a top plan view of the machine.

FIGURE 3 is a vertical transverse sectional view taken on the line 3—3 of FIGURE 1.

FIGURE 5 is an enlarged vertical transverse sectional view taken on the line 5—5 of FIGURE 2.

FIGURE 6 is a horizontal transverse sectional view taken on the line 6—6 of FIGURE 5.

FIGURE 8 is a vertical transverse sectional view taken on the line 8—8 of FIGURE 1.

Figure 1:
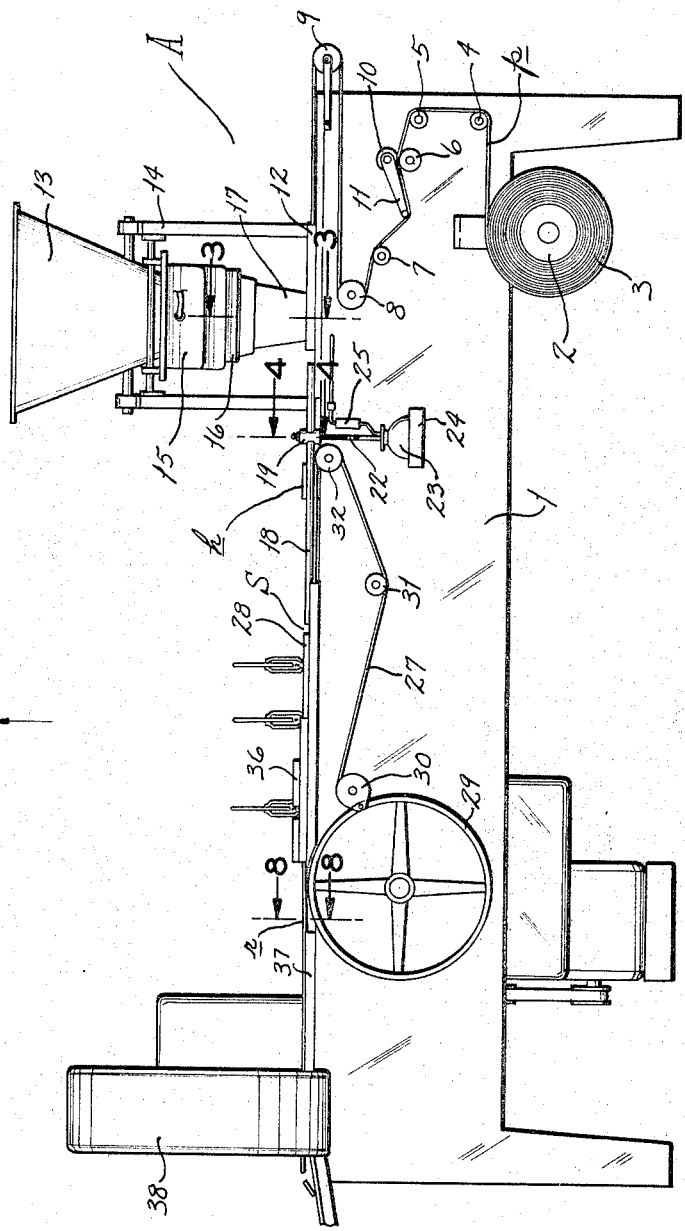
FIGURE 1 is a side elevational view of a match making machine constructed in accordance with and embodying the present invention.

Referring now by reference characters to the accompanying drawings which illustrate the preferred embodiment of the present invention, A generally designates a machine for producing a continuous rod formed from powdered materials, said machine comprising an elongated table or bed 1 proximate one end of which, being the right hand end of FIGURE 1 as viewed and herein referred to as the rearward end, is mounted a drum or wheel 2 for a supply roll 3 of a paper web p of relatively narrow width. The said paper web p is led about vertically aligned guide rollers 4, 5 mounted upon the table 1, and thence in a forward direction over a drive roll 6 mounted for rotation upon said table 1. From said drive roll 6 the web is led forwardly and then rearwardly between guide rolls 7, 8 for training about a roll 9 for directing the paper web forwardly and longitudinally of table 1. Provided for cooperation with drive roll 6 is a rubber covered pinch roll 10 having a follower arm 11 which latter rides upon the paper web p. Said pinch roll 10 is so mounted that when slack developes in paper web p follower arm 11 will swing downwardly effecting a pinching of the paper against drive roll 6 for automatically controlling the tension.

From roller 9 paper web p is received within an elongated support channel 12 disposed upon the top surface of table 1 and having an upwardly opening, semi-circular recess 12′ throughout its length for causing the paper web p received therein to conform to such configuration as the same is moved slidingly therealong, to present a receptacle for powdered material, as indicated at d, discharged from a hopper 13. Said hopper 13 is positioned proximate the rearward end of table 1 and having a supply of material d and being suitably mounted on a frame 14 for vibratory movement, as by means of a conventional vibrator indicated generally at 15, which latter also effects vibration of a feeder 16 located at the lower end of hopper 13 and having a tapered, downwardly extending discharge chute 17 at its end remote from hopper 13. Chute 17 is located immediately above recess 12′ of support channel 12 for assuring reception of the discharged material d upon the now upwardly concave paper web p (FIGURE 3). Electrically operated control means (not shown) are provided for energization of vibrator 15 to vibrate hopper 13 and feeder 16 to assure of the continuous delivery of material d dispensed from hopper 13.

It is indeed obvious that the specific character of the various powdered substances which might be dispensed from hopper 13 are myriad. By way of example only, the said hopper 13 may be charged with the various, dry, powdered compounds adapted for the formation of a re-ignitable match in accordance with the disclosure of pending patent application Ser. No. 439,947. Thus, the hopper charge may consist of an oxygen supplying substance, such as chlorates, perchlorates; an oxygen release catalyst, as for instance manganese dioxide, an agent of relatively low burning characteristic, such as the acrylic resins which may also serve as a binding agent which requires a solvating agent for effecting the binding action. The vibratory action of hopper 13 reliably causes the various powdered substances to be discharged onto the paper web conveyor in desired proportionality so that resultant rod will be of homogeneous character, having a uniformity of composition throughout its entire extent whereby each segment or section will be of like characteristics and properties as the next. It will be recognized that the discharging action of hopper 13 and feeder 16 is continuous, being correlated or synchronized with the rate of travel of paper web $p$.

Axially aligned with channel 12 and presented for reception of the now semi-circularly formed paper web $p$ with its received charge of materials $d$ is an enclosed vapor pipe 18, being in its intermediate portion surrounded by an enclosed vapor chamber 19 (FIGURES 1, 4) having a top wall 19' through which extends a screw 20. Within its lower end wall 21, spacedly beneath pipe 18, vapor chamber 19 receives the upper end of a tube 22 which progresses downwardly to a vessel 23 having a quantity of a binder solvent or solvating agent, such as an aliphatic ketone for the acrylic resin of the re-ignitable match composition. Vessel 23 is disposed upon a heater unit 24 which, upon energization, causes the solvent to vaporize and thus rise upwardly within tube 22 for discharge into chamber 19. A reservoir of the solvent can be located at any convenient place for gravity feed, as through a conduit 25 to vessel 23.

Figure 4:
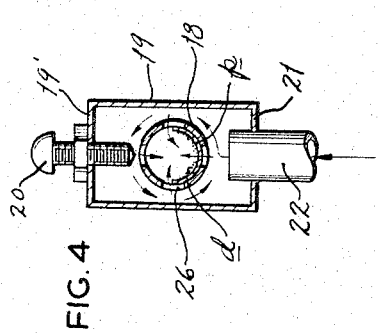
FIGURE 4 is a vertical transverse sectional view taken on the line 4—4 of FIGURE 1.

As indicated by arrows in FIGURE 4, the vapor entering chamber 19 will flow into the interior pipe 18 by way of a plurality of openings 26 provided in the side and top portion of said pipe. Screw 20 at its lower end is received in the opening 26 on the top of pipe 18 for controlling the amount of vapor flowing therethrough. The said vapor admitted to the interior of pipe 18 is received upon the materials $d$ carried by the paper web conveyor, for saturation of such materials in order to activate the binder so as to promote adhesion between same and the other components of the mixture. As with the aforesaid re-ignitable match, any of the well known acrylic resin solvents might be utilized, such as indicated above, the aliphatic ketones, among others, which upon heating vaporize for purposes of the present procedure. The vapor from solvent readily and uniformly penetrates the powdered material $d$ and permits use of a minimum amount of solvent since the same must, at a later juncture be driven off. If a solvent in liquid phase were utilized, it would be necessary to completely saturate the material $d$ to achieve uniform distribution unless physical mixing means were simultaneously used. Furthermore, a liquid solvent would present a sticky, plastic mass difficult for handling and requiring relatively extended time for removing the solvent.

Provided about vapor pipe 18, forwardly of vapor chamber 19, is a heater $h$, as of the electrical high resistance type, for causing the mixture of materials $d$ to be maintained in a plastic, readily moldable mass. Upon emission from the forward end of vapor pipe 18, the arcuated paper web $p$ with its now plastic mixture is accepted upon an endless belt 27 for conveyance to, and through, a garniture or forming thimble 28 which is axially aligned with the said vapor pipe 18 and spaced therefrom a short distance S.

Said endless belt 27 is trained at one end about an enlarged drive wheel 29, located proximate the forward end of table 1, being thence rearwardly directed about a guide roller 30, then under a pulley 31, and being upwardly and forwardly trained at its rearward end about a guide roller 32; said drive wheel 29 being rotated by means described hereinbelow. The said drive wheel 29 and roller 32 are positioned so as to cause the upper course of belt 27 to travel below vapor pipe 18 and forwardly within an upwardly inclined guideway 33 which is presented beneath the forward end portion of vapor pipe 18 and spans spacing S for connection to, and alignment with, garniture 28. Said guideway 33 gradually assumes an upwardly concave, or semi-circular, configuration in cross section for causing belt 27 to conform to such shape in order that there may be snugly disposed upon said belt paper web $p$ with the plastic mixture $d$ carried thereby for conducting the latter through garniture 28. Belt 27 is formed of preferably a tight woven fabric designed for resistance to break-down from heat, as well as to prevent heat loss therethrough. Material such as asbestos or cotton are preferred. The width of belt 27 is substantially the same as paper web $p$.

Figure 7:
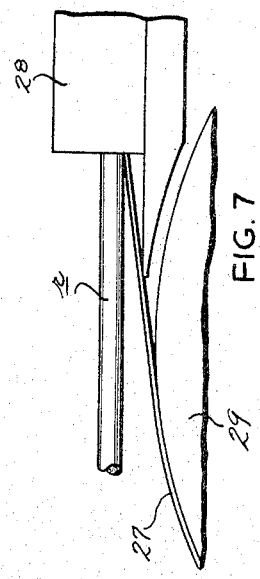
FIGURE 7 is a fragmentary enlarged view illustrating the formed rod and belt at the point of discharge from the garniture.

Garniture or forming thimble 28 comprises an enclosed tubular passage 34 which longitudinally tapers forwardly and inwardly, with its widest portion or mouth $m$ at its rearward end so that material moving therethrough is gradually compressed into conformity with the reduced or narrow portion, as indicated at 35, of said garniture 28; said portion 35 being circular in cross section and of constant diameter. Garniture 28 is designed and dimensioned so that passage 34 and portion 35 thereof may receive belt 27, together with the embraced paper web $p$ and mixture $d$ supported thereby in order to cause the latter to be formed into rod shape with the paper web $p$ being wrapped thereabout. Belt 27 is thus, in turn, wrapped tightly about the thus formed rod $r$ during travel through garniture portion 35. It will be seen that such close gripping of belt 27, the now formed rod $r$, together with its paper casing, will be pullingly advanced through garniture 28, said rod $r$ being subjected to desired pressure for effecting cohesion of the rod ingredients, with the said belt simultaneously assuring of proper heat retention. Surrounding the forward end portion of garniture 28 is a heater 36 which also may be of the electrical high resistance type for presenting a thermal environment conductive to the rod formation while preventing any inadvertent premature hardening or setting. Upon emission from the forward end of garniture 28 belt 27 will be liberated from the confining effects thereof for returning to its normal flat character (see FIGURE 7) and thus withdrawing from wrapped disposition about the paper covered rod $r$ and being directed about drive wheel 29 for return travel. The formed rod $r$ with the paper web $p$ wrapped thereabout is received within an upwardly opening arched conduit 37 for support during cooling, and for delivery to an automatic cutter (not shown) by introduction into a cutter housing 38 wherein the rod $r$ is severed into units $s$ of predetermined length; such units $s$ which constitute fully operable re-ignitable matches are discharged from housing 38 into a suitable collecting device (not shown).

Paper web drive roll 6 and belt drive wheel 29 are operated by means of a prime mover M which is connected through suitable motion transmitting means indicated generally 39 to a clutch and gear transmission denoted 40 which latter, in turn, is connected by a belt 41 to a main or line shaft 42 disposed within table 1 and extending longitudinally thereof; there being bearings (not shown) for journaling of said shaft 42. Conventional take-off means, such as by worm and sector, or bevel gears, are provided for effecting rotation of said drive roll 6 and wheel 29. In accordance with customary practice, the cutter (not shown) is properly synchronized so as to sever the formed rod $r$ into units $s$ of requisite longitudinal extent.

It should be observed that in the formation of the units $s$ for the said re-ignitable match, the provision of the encasing paper web provides physical strength for the match and materially assists in controlling the burning characteristics of the match. As shown above, the said paper web $p$ serves as a conveyor for receiving the powdered discharge from hopper 13 and for retaining same during travel through machine A, including providing a proper base for the solvating action. The wrapping of endless belt 27 about paper web $p$ brings about a unique physical engagement of the two conveyors whereby belt 27 serves to pull the powdered charged paper web $p$ through machine A as well as to effect the requisite force for pushing the formed rod $r$ to the cutter.

In view of the foregoing it will be noted that the machine of the present invention is adapted for high volume, rapid operation, being automatic in all phases of its operation so as to obviate the necessity of the services of skilled personnel. Although machine A is especially suited for production of the re-ignitable match, as above referred to, the said machine is readily adaptable for myriad other related uses. The operation of hopper 13 is such as to reliably provide a discharge which is of constant composition throughout despite the fact that a plurality of ingredients of different quantities are incorporated in each resultant end product, namely the units s.

It should be understood that changes and modifications in the formation, construction, and arrangement and combination of the several parts of the match making machine may be made and substituted for these herein shown and described without departing from the nature and principle of our invention.

Having thus described our invention, what we desire to obtain by Letters Patent is:

1. A machine for producing solid rod units from powdered material comprising:
   a conveyor fabricated of disposable material,
   means for transversely arcuating said conveyor to define an upwardly opening trough,
   means located upwardly of said arcuating means for dispensing powdered filler material onto said transversely arcuated conveyor,
   tubular-forming means for receiving the transversely arcuated conveyor,
   means within said tubular-forming means for discharging a cohesion-producing agent onto the powdered filler material received within said arcuated conveyor,
   means for applying heat to the exterior of said tubular-forming means for maintaining the plasticity of the materials within said conveyor,
   an endless belt in underlying relationship to said conveyor for receiving same after traverse of the latter through said tubular means,
   drive means for said endless belt,
   guide means for directing said belt into an upwardly concave configuration for disposition about said arcuated conveyor,
   garniture means for receiving said conveyor and said belt for directing the latter into enclosing relationship about the former,
   means for disengaging said belt from wrapped disposition about said conveyor,
   and means for severing said conveyor with the contained material into units of predetermined length.

2. A machine for producing solid rod units from powdered material as defined in claim 1 and further characterized by means defining a container for the cohesion-producing agent provided adjacent said conveyor, heating means for application to said container for vaporizing the agent therein, chamber-defining means surrounding said tubular-forming means, means connecting said tubular forming means and said chamber-defining means, and means for directing vaporized cohesion-producing agent into said chamber-defining means.

3. A machine for producing solid rod units from powdered material as defined in claim 1 and further characterized by heat producing means provided in immediate proximity to said garniture means.

4. A machine for producing solid rod units from powdered material as defined in claim 1 and further characterized by said conveyor being formed of cellulosic material and said belt being formed from materials resistant to break-down through heat and having low heat transference properties.

5. A machine for producing solid rod units from powdered material as defined in claim 4 and further characterized by said means for transversely arcuating said conveyor, said tubular forming means, and said garniture means being co-axially aligned.

References Cited
UNITED STATES PATENTS

| | | | |
|---|---|---|---|
| 2,141,405 | 12/1938 | Randall | 18—4 |
| 2,898,626 | 8/1959 | Alderfer et al. | 18—4 XR |
| 2,952,037 | 9/1960 | Ruck et al. | 18—4 XR |
| 3,034,945 | 5/1962 | Bush | 264—128 XR |
| 3,041,660 | 7/1962 | Fink | 18—6 XR |
| 3,163,689 | 12/1964 | Ives. | |

FOREIGN PATENTS 802,713  10/1958  Great Britain.

WILLIAM J. STEPHENSON, *Primary Examiner.*